April 29, 1941. G. A. TINNERMAN 2,239,798
HANDLE OR KNOB MOUNTING AND THE LIKE
Filed June 1, 1939
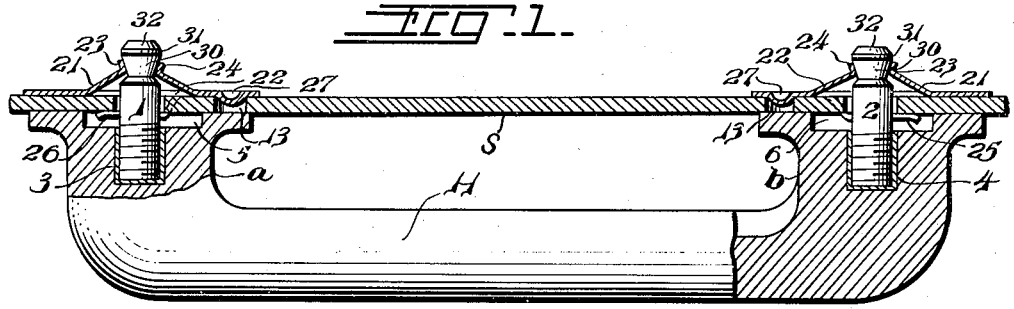
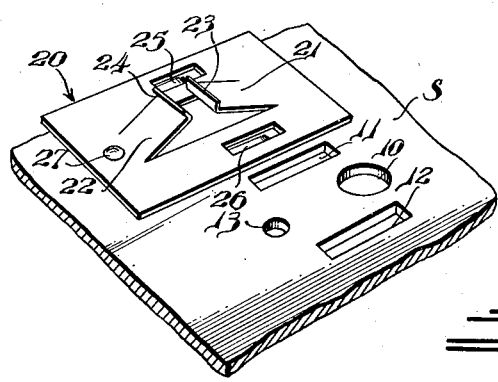
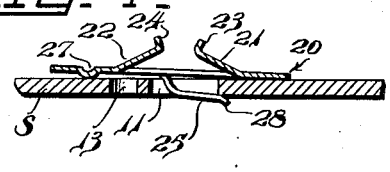
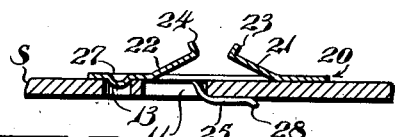
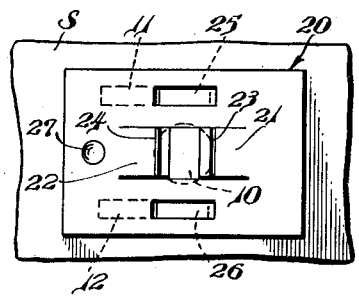
Inventor
GEORGE A. TINNERMAN
By H. G. Lombard
Attorney Patented Apr. 29, 1941

2,239,798

UNITED STATES PATENT OFFICE 2,239,798

HANDLE OR KNOB MOUNTING AND THE LIKE

George A. Tinnerman, Rocky River, Ohio, assignor, by mesne assignments, to Tinnerman Products, Inc., Cleveland, Ohio, a corporation of Ohio.

Application June 1, 1939, Serial No. 276,897

6 Claims. (Cl. 16—114)

This invention relates in general to an improved mounting for knobs, handles and like articles of manufacture by which such devices may be easily and quickly secured to an apertured supporting structure by a simple operation taking place entirely from the forward or readily accessible side thereof.

More particularly, the present invention is directed to the provision of an improved knob or handle mounting, and the like, comprising a simple, inexpensive form of sheet metal fastening device provided with cooperating attaching means and article securing means, the attaching means being adapted to maintain the sheet metal fastening in desired position on a supporting structure preparatory to the mounting of the article to be secured by a connecting stud fastening associated therewith applied to said article securing means of the fastening device.

In many assemblies, it is often necessary or desirable for the knobs, handles and other auxiliary attachments to be mounted when the structure is completed or set up ready for use, and to this end, it is usually found expedient to provide a fastening means which, of course, is concealed and otherwise adapted to provide the desired mounting without requiring access to the interior of the structure, in what is known generally as a blind fastening installation. In such an arrangement, the fastening device is provided with attaching means serving to maintain the same in desired position at the reverse side of the support in a completed assembly such that the operator may mount the knob, handle or other part entirely from the forward side thereof in a minimum of time and effort in completing the installation.

Generally speaking, a preferred construction of the invention contemplates the provision of a fastening device having securing means in the form of a pair of cooperating stud engaging elements comprising substantial spring arms provided with cam lip extremities designed not only to provide a positive locked engagement with the connecting stud but also, to exert a pronounced axial drawing action thereon ensuring a rigid, tight, substantially locked installation of the parts secured under continuously effective spring tension. The fastening device otherwise includes a preferred form of attaching means comprising a pair of substantial tongues designed to hold the fastening device in self-retained position on the supporting structure preparatory to the application of the connecting stud fastening to the securing means thereof in mounting the handle, knob or like part on the supporting structure. Thus, by reason of the rigid attachment of the fastening device to the reverse side of the support and the axial drawing action supplied by the cam lip extremities of the stud engaging elements thereof, the connecting stud on a part to be mounted may be applied to fully tightened locked fastening position by a simple, axial, thrust-like motion, by which the knob, handle or other part is automatically drawn taut and fixedly secured in firm, rigid engagement with the adjacent surface of the support. It will be therefore recognized in the present invention, that the usual rotation required for tightening a part secured by a screw threaded or other rotary fastening is unnecessary which, naturally, is of great importance in installations in which the connecting studs are not accessible for turning. For example, in a plastic handle construction requiring two or more connecting studs, the present practice is to mold the handles with the heads of the bolts or stud fastenings concealed therein whereupon the complementary nuts therefor are threaded onto the connecting studs or shanks of the bolts from the reverse side of the support. However, in a blind location the reverse side of the support is not conveniently or readily accessible in a completed installation, and in order to employ such a handle, it must be mounted entirely from the forward side of the support by a simple, axial, thrust-like motion of the connecting studs to applied fastening position, since, as stated, the studs are not accessible for turning, and, of course, the handle cannot be rotated to tighten the studs inasmuch as the same is mounted thereby at spaced points.

A primary purpose of the invention, therefore, is to provide a mounting of the kind described comprising a sheet metal fastening device that may be inexpensively constructed with an improved type of attaching means by which the device may be easily and quickly applied to fastening position in interlocked engagement with the supporting structure, and retained in such fastening position against inadvertent disconnection or accidental removal without the use of extraneous bolts, screws, rivets, welding or the like attaching means preparatory to its use for securing the handle, knob, or other part in mounted position.

Another principal object of the invention is to provide an improved arrangement for interlocking such a sheet metal fastening device to one side of a panel-like supporting structure by providing an attaching tongue or tongues thereon which may be inserted in a slot or slots in said structure and positioned in locking engagement therewith by sliding the fastening device to applied fastening position in which the same is fixedly and rigidly retained on said support in a manner to secure a cooperating connecting stud associated with the knob, handle or other article of manufacture to be mounted.

A further object is to provide a mounting comprising a fastening device embodying the foregoing features of construction and including stud securing means in the form of cooperating substantial spring arms provided with cam lip extremities adapted for substantial cam fastening engagement with the shank of a connecting stud on a part to be mounted whereby the same is automatically drawn taut and fixedly retained in firm, rigid engagement with the adjacent surface of the support in final applied mounted position.

Still another object is to provide in such a mounting, an arrangement wherein the connecting stud associated with a part to be secured to the support may be applied by a simple, axial, thrust-like motion by which the stud engaging elements of the fastening device have a substantial snap fastening engagement with the connecting stud to lock the same positively against loosening or retrograde axial movement and otherwise exert an axial drawing action thereon to provide a firm, rigid and tightly secured installation.

A more specific object is for the provision of a sheet metal fastening device of the kind described provided with an improved form of attaching means comprising distinct, cooperating attaching tongue and locking lug means, the attaching tongues being received in assembling openings in the supporting structure and positioned in locking engagement therewith by sliding the fastening device to final applied position in which the locking lug thereon serves to retain the same in positive locked assembled relation on the reverse side of said supporting structure such that the knob, handle or like part may be mounted by an operation taking place entirely from the forward side thereof.

Further objects and advantages and other new and useful features in the construction, arrangement and general combination of parts of the invention will be readily apparent to those skilled in the art as a description thereof proceeds with reference to the accompanying drawing in which like reference characters designate like parts throughout the same, and in which:

Fig. 1 is a side elevational view of an improved handle construction in accordance with the invention, the handle being represented partly in section to show in detail the construction of the securing means therefor;

Fig. 2 is a perspective of one of the fastening devices in the relation it assumes on being attached to one side of a supporting part provided with a perforated area for this purpose;

Fig. 3 is a plan view showing the fastening device in its final attached fastening position on the supporting structure;

Fig. 4 is a sectional view illustrating the initial step in attaching the fastening device by inserting an attaching tongue thereon in an assembling slot provided in the supporting structure;

Fig. 5 is a similar view of the fastening device in fully attached fastening position;

Fig. 6 is a view showing in section the mounting of a knob or the like article of manufacture in accordance with the invention.

As shown in Fig. 1, a handle H, or the like article of manufacture of any selected shape and design usually embodies a pair of spaced hubs, $a$, $b$, which are provided with connecting studs $1$, $2$, secured thereto in any desired manner as by screw threading the shanks therein or anchoring the same by any suitable rivet means, or the like. In the event the handle is of hardened plastic composition the connecting studs are provided thereon with the least expense by molding the handles with the studs anchored directly therein together with suitable inserts $3$, $4$, if desired, such that the studs are completely concealed from view in a most desirable manner to provide a handle construction having a neat and artistic appearance when mounted in an installation. Preferably, suitable cavities $5$, $6$, are provided at the bearing surfaces of the hubs $a$, $b$, in order that the same may be brought into close, flush engagement with the adjacent surface of the supporting structure in the mounted position of the handle or the like, thereon, as hereinafter more fully set forth.

The supporting structure, designated generally S, may be of any suitable metal, wood or fibre board construction but usually is in the form of a metallic plate or panel-like member such as employed on the doors of ranges, refrigerators and similar cabinet structures. The supporting structure is provided with a perforated area, substantially as shown in Fig. 2, for receiving each of the connecting studs and attaching the fastening device employed therewith in providing the desired mounting, it being understood that such perforated areas are of a predetermined spacing to receive the fastening devices applied thereto in a manner to position the same in fully attached position in overlying relation to the stud passages in the support, which stud passages have a spacing corresponding substantially to that of the connecting studs $1$, $2$, on the handle. Inasmuch as such perforated areas and the fastening devices attached thereto are substantially similar in the present illustration only one need be described in detail for a full understanding thereof. As best seen in Fig. 2, each such perforated area to which a fastening device is applied comprises a stud passage $10$, and substantial assembling slots $11$, $12$, on either side thereof together with a lug receiving recess $13$; these several openings are simple in outline and accordingly may be formed in the supporting part with little or no added cost in the same punching operation by which the necessary stud passage $10$ would be provided in any event. Preferably, a stud passage is made of a size slightly larger than necessary to receive the shank of the stud in order that the same may pass freely therethrough and be secured in any suitable position of adjustment as may be necessary or desirable.

The spring fastening device, designated generally $20$, Fig. 2, may be constructed of any selected size and configuration in accordance with the shape and proportion of the parts to be secured, and preferably is provided from a relatively small, inexpensive, substantially rectangular section of sheet metal which may be severed from ordinary metal strip stock without loss or waste of material whatsoever. Any suitable sheet metal may be employed but preferably that of spring metal nature such as spring steel or cold rolled steel having spring characteristics and usually of a much greater tensile and compressive strength than the material of the supporting structure with which the fastening device is employed.

By suitable slitting, punching and bending operations, the sheet metal section thus provided is formed into a substantial locking plate type of fastening device comprising stud engaging elements 21, 22, projecting out of the plane of the base thereof in the manner of spring arms having substantial cam lips 23, 24, for frictionally and grippingly engaging the bolt or stud fastening connected thereto in applied fastening position. It will be understood that such stud engaging elements or spring arms 21, 22 are of the character designed to yield in permitting a cooperating stud to be passed therethrough readily in one direction to applied fastening position, in which relation the fastening device is effective to provide automatically a rigid, tightened securing action with the connecting stud under continuously effective spring tension, as presently to be described. In the applied fastening position of the connecting stud with the spring arms of the fastening device, any ordinary axial movement of the stud toward disengagement or removal therefrom not only is prevented, but also results in the movement of the spring arms toward each other in a direction to diminish the space therebetween and otherwise cause the cam lip extremities thereof to engage the stud even more positively and prevent the same from being withdrawn.

In addition to the spring arm securing means thus provided, the fastening device includes attaching members in the form of substantial tongues 25, 26, designed to hold the device in self-sustaining position on the rear side of the supporting structure preparatory to the application of a connecting stud thereto in securing the knob, handle or other part to be mounted to the forward side of such supporting structure. The said tongues 25, 26 are struck from the body or base of the fastening device to project therefrom on the side opposite to that from which the spring arm securing means 21, 22 project, as aforesaid, and with their free ends extending in the same general direction. In this relation, said tongues 25, 26 are preferably provided at either side of the spring arm securing means 21, 22, as shown in Fig. 3, to fixedly and rigidly secure the fastening device to the supporting structure at spaced points thereby preventing any relative movement thereof which would disalign said spring arm stud engaging elements out of registration with the stud passage in the support in the fully attached position of the fastening device thereon. At the rear of the points at which such tongues are integral with the base of the fastening device, a suitable locking lug element 27 is provided, if desired, and preferably by means of a small nub or teat provided by a countersunk portion which is pressed out of the plane of the base of the fastening device. Such locking lug element, of course, may be provided at any other suitable point of the base of the fastening so long as it is designed to engage in a recess in the support in the manner of a substantial indexing means serving to properly position the fastening device thereon with its stud engaging elements 21, 22 overlying the stud passage in the support at the reverse side thereof.

With the fastener thus provided and the supporting structure prepared with the stud passage 10 and assembling slots 11, 12, substantially as shown in Fig. 2, the fastener may be easily and quickly attached to positive locked fully attached fastening position at the reverse side of the supporting structure simply by inserting the attaching tongues 25, 26, in such assembling slots 11, 12, as shown in Fig. 4, in a position to engage at the forward side of the support. Slightly flared extremities 28 on the tongues facilitate this operation and accordingly, by depressing the body of the fastener, as, for example, in the area of the locking lug 27, the tongues slightly clear the adjacent surface of the support and permit the fastening device to be slid longitudinally to its fully attached position, substantially as shown in Fig. 5, in which the stud engaging elements or spring arms 21, 22, overlie the bolt passage 10 at the reverse side of the support in the manner illustrated in Fig. 3. In this position, the locking lug 27 is received in the recess 13, Fig. 5, to retain the fastening device in final attached fastening position and prevents any retrograde movement thereof which would allow the attaching tongues to become disassociated from the assembling slots and permit the device to be accidentally removed or dislodged from its proper fully attached fastening position on the support. Preferably the tongues 25, 26 are spaced from the underside or base of the fastening device a distance slightly less than the thickness of the support so as to frictionally and grippingly engage the same in fully attached position whereupon the tongues themselves are capable of holding the fastening device in self retaining position on the support, and the locking lug element 27 and the recess 13 therefore need not be provided unless a substantially permanent, positive locked attachment of the fastening device to the support is required. In another relation, the tongues 25, 26, may be spaced from the underside of the fastening device a distance somewhat greater than the thickness of the supporting part with the base thereof having a generally arched or bowed configuration serving as a resilient take up means to maintain the attaching tongues in rigid engagement with the support in fully attached position. In this way the attaching tongues are adapted to compensate for irregularities and manufacturing variations in the thickness of the supporting part and otherwise permit the use of a standard size fastening device with any of several supporting structures of different thicknesses.

The connecting studs 1, 2, Fig. 1, are preferably substantial, rivet-like, threadless shank members each having, generally speaking, a diameter greater than the space between the cam lip extremities 23, 24 of the spring arm securing means of the fastening device in normal untensioned relation, wherefore an effective fastening engagement would be obtained even though the shank of such a connecting stud is substantially plain and smooth throughout its length. However, as shown, in order to provide for a positive locked fastening engagement, such a connecting stud is preferably formed with a peripheral groove providing a tapered cam surface 30 and otherwise presenting a substantial shoulder or abutment 31 against which the cam lip extremities of the spring arms of the fastening device are designed to abut in providing a rigid, positive locked fastening installation. Said cam surface 30, and shoulder 31 are, of course, provided at a suitable predetermined point on the connecting stud shank in accordance with the projecting relation of the same with reference to the cam lip extremities 23, 24 of the spring arms of the sheet metal fastening device in its final applied position. The stud fastening otherwise may be tapered at its leading end as at 32 to provide a substantial pilot which may be readily introduced between the extremities of the spring arms 21, 22, and thereby facilitate the initial movement of the connecting stud to final applied fastening position. It will be understood that the spring arms 21, 22, of the fastening device are so designed that the cam lip extremities 23, 24, thereof are spaced apart in normal untensioned relation a distance substantially equal to or less than the diameter of the stud at the substantial bottom of the groove providing the cam surface 30 and shoulder 31. Accordingly, such a connecting stud member is easily and quickly applied to fastening engagement with the spring arms of the fastening device simply by pressing or pushing the connecting stud in a substantial axial, thrust-like motion by which the entering end 32 of the stud gradually spreads the spring arms 21, 22, apart sufficient to clear the shoulder 31 and seat the cam lips 23, 24, on the relatively long tapered cam surfaces 30 of the stud, substantially as shown in Fig. 1. In this position, the spring arms 21, 22 of the fastening device naturally tend to assume their initial, normally untensioned relation and accordingly, cause the cam lips 23, 24 to ride on the relatively long cam surface 30 of the stud thereby exerting an axial drawing action thereon in a reverse direction to draw up the bearing surface of the part secured toward the adjacent surface of the support and thus provide automatically a rigid, tight, substantially locked installation therefor under continuously effective spring tension supplied by the spring arms 21, 22. Preferably, cavities such as 5, 6, are provided in the bearing surfaces of the part mounted in order to clear the projecting portion of the attaching tongues 25, 26, and thereby permit the same to seat in close flush engagement with the adjacent surface of the supporting part. If desired, the shoulder 31 may be made of a more or less pronounced shape, as desired, to provide a permanently locked fastening installation from which the connecting stud could not be removed except by a mutilation and distortion of the spring arms of the fastening device.

From the foregoing, it will be understood that the fastening means employed in the present invention is particularly suited for use in a handle mounting such as shown in Fig. 1, wherein the supporting structure S is provided with spaced perforated areas as described with reference to Fig. 2, by which a pair of the spring arm securing devices may be attached to the support and held in self-retained position at the rear side thereof in a completed assembly with the stud engaging elements 21, 22 thereof overlying the respective stud passages provided in the support. Such stud passages have, of course, a spacing corresponding substantially to that of the connecting studs 1, 2, on the handle to readily receive the same and accordingly, the handle may be mounted any time after an assembly is completed and made ready for use without dismantling any of the parts thereof inasmuch as the mounting operation takes place entirely from the forward side of the support by a simple procedure in which the connecting studs are forced axially by substantial snap fastening action into positive locked engagement with the spring arms 21, 22, of the respective fastening devices associated therewith, substantially in the manner aforesaid.

Fig. 6 shows the teachings of the present invention as embodied in a mounting for a knob or like object comprising a body 40 of any selected shape or form including a bearing surface 41 and carrying a single connecting stud for mounting the same entirely from the forward side of a supporting part substantially in the manner described with reference to Figs. 1 to 5 inclusive. An advantage in this construction however, resides in the fact that the device can not be removed or become accidentally loosened by ordinary rotation thereof as in a mounting secured by a screw threaded fastening, inasmuch as the cam shoulder 31 is continuous in extending completely around the periphery of the connecting stud shank. Thus, any turning of the knob causing rotation of the connecting stud cannot dislodge the cam lip extremities 23, 24 of the spring arms out of their initial substantially locked fastening engagement with the cam surface 30 thereon.

It will be readily appreciated that the handle or knob mounting and the like of the present invention involves a number of most important advantages over heretofore known arrangements in which the use of conventional threaded nuts and bolts rotated into fastening position requires access to the reverse side of the supporting part for the necessary turning thereof. However, in blind fastening locations frequently found in present day range and cabinet constructions, access to the reverse side of the supporting part cannot be had to apply threaded nuts to connecting studs or bolts to threaded sockets without dismantling a certain portion of the completed structure which, of course, not only is highly objectionable but decidedly impractical in many instances. By the present invention, the sheet metal fastening devices 20 may be attached as necessary to the reverse side of a panel or other supporting part in the fabrication of a structure at the place of manufacture, whereupon the selected handles, knobs, and the like may be mounted onto the completed assembly any time thereafter by the simple method and means described.

When once mounted a handle or other object secured to the supporting part in accordance with the present invention, is not usually readily removable by ordinary axial pull on the connecting studs in a direction opposite to that in which the same are applied, and if it becomes necessary to dismount an installation this, of course, may be accomplished by applying a suitable tool to the spring arms 21, 22 of the sheet metal fastening device at the reverse side of the support in a manner to spread the same apart and permit a release and removal of the connecting stud therefrom. However, as stated, the reverse side of the supporting part is not always readily accessible whereupon a dismounting operation must usually take place entirely from the forward side of the support. To this end, it has been found this can be accomplished by effecting a substantial lateral turning movement to a connecting stud at right angles to its axis by means of a wedging tool applied under the bearing surface of the part mounted or through suitable force on the handle thereof to exert a torque on the connecting stud shank. The cam surface 30 of the connecting stud is thus caused to cam laterally against the cam lip extremities 23, 24 of the spring arms transversely thereto and thereby gradually spread the same apart until the connecting stud shoulder 31 is removable therefrom.

Although in the foregoing description and the accompanying drawing, the disclosure is directed to preferred embodiments of the invention in both knob and handle constructions, it is obvious that the invention is applicable wherever an operating member, push or pull device, gripping element or the like is to be mounted onto a supporting wall, particularly a sheet metal wall member. Accordingly, it will be understood that the disclosure is not to be limited to any strict interpretation of the word "handle" as used in the accompanying claims but should be considered generally as defining knobs, gripping devices, supporting devices, drawer pulls, and the like articles of manufacture.

While the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. A mounting for securing an article of manufacture to a supporting structure provided with a stud passage, an assembling opening and a separate lug recess, said mounting comprising a sheet metal fastening device provided with stud engaging means, an attaching tongue and a locking lug, said attaching tongue being receivable in said assembling opening and upon sliding movement of the fastening device to fastening position cooperating with the body of the fastening device to engage opposite sides of said supporting structure in holding the fastening device in applied position thereon with said stud engaging means overlying said stud passage therein, said locking lug engaging in said separate lug recess to lock the fastening device in such applied position and said article to be mounted having a connecting stud receivable in said stud passage and positively engaged by the stud engaging means of the fastening device in the applied mounted position of said article on the supporting structure.

2. A mounting for securing an article of manufacture to a supporting structure, provided with a perforated area including a stud passage, spaced assembling openings and a separate lug recess, said mounting comprising a sheet metal fastening device provided with stud engaging means, a pair of spaced attaching tongues and a locking lug, said attaching tongues being receivable in said assembling openings and upon sliding movement of the fastening device to fastening position cooperating with the body of the fastening device to engage opposite sides of said supporting structure in holding the fastening device in applied position thereon with said stud engaging means overlying said stud passage therein, said locking lug engaging in said separate lug recess to lock the fastening device in such applied position and said article to be mounted having a connecting stud receivable in said stud passage and positively engaged by the stud engaging means of the fastening device in the applied mounted position of said article on the supporting structure.

3. A mounting for securing an article of manufacture to a supporting structure provided with a perforated area including a stud passage, spaced assembling openings and a separate lug recess, said mounting comprising a sheet metal fastening device provided with stud engaging means, a pair of spaced attaching tongues and a locking lug, said stud engaging means comprising a pair of cooperating spring arms having cam lip extremities, said attaching tongues being receivable in said assembling openings to cooperate with the body of the fastening device in engaging opposite sides of said supporting structure to hold the fastening device in applied position thereon with said stud engaging means overlying said stud passage therein and with said locking lug engaging in said separate lug recess to lock the fastening device in such applied position, said article to be mounted having a connecting stud provided with a cam shoulder and being receivable in said stud passage in the supporting structure, said cam lip extremities of the spring arms positively engaging said cam shoulder on the connecting stud to exert an axial drawing action thereon and thereby automatically draw and maintain the bearing surface of said article in close, flush engagement with the supporting structure in applied mounted position.

4. In a mounting for securing an article to a support, said support being provided with a stud passage, assembling openings on either side of said stud passage and a separate locking lug recess, said article having a connecting stud receivable in said stud passage, a sheet metal fastening device having a body portion provided with stud engaging means, a locking lug and attaching tongues extending from said body portion on either side of said stud engaging means, said tongues projecting in spaced relation from the under face of said body portion and being receivable in said assembling openings in the support, said tongues upon sliding movement of the fastening device to fastening position cooperating with said body portion of the fastening device to engage opposite sides of said support in holding the fastening device thereon, said locking lug engaging in said separate lug recess to lock the fastening device in such fastening position with said stud engaging means thereof overlying said stud passage in the support, said connecting stud on the article to be secured being positively engaged by said stud engaging means of the fastening device in the applied mounted position of said article on the support.

5. In a mounting for securing an article to a support, said support being provided with a stud passage, assembling openings on either side of said stud passage and a separate locking lug recess, said article having a connecting stud receivable in said stud passage, a sheet metal fastening device having a body portion provided with stud engaging means, attaching means and a locking lug, said stud engaging means comprising a pair of spring arms projecting from said body portion from the upper face thereof, said attaching means comprising a pair of tongues on either side of said stud engaging spring arms and projecting in spaced relation from the under face of said body portion, said attaching tongues being receivable in said assembling openings in the support and upon sliding movement of the fastening device to fastening position cooperating with said body portion of the fastening device to engage opposite sides of said support in holding the fastening device thereon, said locking lug engaging in said separate lug recess to lock the fastening device in such fastening position with said stud engaging spring arms thereof overlying said stud passage in the support, said connecting stud on the article to be secured being positively engaged by said spring arms of the fastening device in the applied mounted position of said article on the support.

6. In a mounting for securing an article to a support, said support being provided with a stud passage, assembling openings on either side of said stud passage and a separate locking lug recess, said article having a connecting stud receivable in said stud passage, a sheet metal fastening device having a body portion provided with stud engaging means, attaching means and a locking lug, said stud engaging means comprising a pair of spring arms having cam lip extremities and projecting from said body portion from the upper face thereof, said attaching means comprising a pair of tongues on either side of said stud engaging spring arms and projecting in spaced relation from the under face of said body portion, said attaching tongues being receivable in said assembling openings in the support and upon sliding movement of the fastening device to fastening position cooperating with said body portion of the fastening device to engage opposite sides of said support in holding the fastening device thereon, said locking lug engaging in said separate lug recess to lock the fastening device in such fastening position with said stud engaging springs arms thereof overlying said stud passage in the support, said connecting stud on the article to be secured having a cam shoulder adapted to be positively engaged by the cam lip extremities of the spring arms of the fastening device to exert an axial drawing action thereon and thereby automatically draw and maintain the bearing surface of said article in rigid engagement with the support in applied mounted position.

GEORGE A. TINNERMAN.